United States Patent
Tangprasertchai et al.

(10) Patent No.: US 7,014,878 B2
(45) Date of Patent: *Mar. 21, 2006

(54) REFRIGERATED EXTENDED SHELF-LIFE BREAD PRODUCTS

(75) Inventors: Uraiwan Tangprasertchai, Inverness, IL (US); Keith Daniel Forneck, Streamwood, IL (US); Laura Gail Hill, Prospect Heights, IL (US); Lisa Apel, Evanston, IL (US); John Dewalt, South Holland, IL (US); David Carl Richards, Hobart, IN (US); Dhruba Jyoti Das, Gurnee, IL (US); Lynell Morales, Chicago, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 173 days.

This patent is subject to a terminal disclaimer.

(21) Appl. No.: 10/198,562

(22) Filed: Jul. 18, 2002

(65) Prior Publication Data

US 2004/0013781 A1    Jan. 22, 2004

(51) Int. Cl.
 *A21D 13/00* (2006.01)
(52) U.S. Cl. .......................... 426/549; 426/19; 426/62; 426/106; 426/120
(58) Field of Classification Search ................. 426/94, 426/120, 549, 19, 62, 106, 138
See application file for complete search history.

(56) References Cited

U.S. PATENT DOCUMENTS

| | | | |
|---|---|---|---|
| 4,211,694 A | 7/1980 | Youngquist | |
| 4,582,711 A * | 4/1986 | Durst | 426/128 |
| 4,990,343 A | 2/1991 | Haarailta et al. | |
| 5,059,432 A | 10/1991 | Berkowitz et al. | |
| 5,209,938 A | 5/1993 | Kraus | |
| 5,409,717 A | 4/1995 | Apicella et al. | |
| 5,601,012 A | 2/1997 | Ellner | |
| 5,974,934 A | 11/1999 | Woods | |
| 6,042,864 A | 3/2000 | Bastasch et al. | |
| 6,048,558 A | 4/2000 | Feldmeier et al. | |
| 6,068,864 A | 5/2000 | Barrett et al. | |
| 6,197,356 B1 | 3/2001 | Girsh | |
| 6,210,723 B1 | 4/2001 | Coleman et al. | |
| 6,270,813 B1 | 8/2001 | Nielsen et al. | |
| 6,306,445 B1 | 10/2001 | Xu et al. | |

OTHER PUBLICATIONS

U.S. Appl. No. 10/043,004, filed Sep. 26, 2002.
David, Elizabeth. *English Bread and Yeast Cookery* American Edition, Viking Press, 1977, p. 255.

* cited by examiner

*Primary Examiner*—Lien Tran
(74) *Attorney, Agent, or Firm*—Fitch, Even, Tabin & Flannery

(57) ABSTRACT

A fully baked bread product is provided which can be stored for extended periods of time and which retains its desirable soft texture for the shelf life (e.g., at least about 3 months) of the product if maintained under a modified atmosphere (i.e., low oxygen and preferably inert gas) at refrigerated conditions (i.e., about 35 to about 45° F.). The fully baked bread is prepared from dough comprising, in baker's percentages, about 100 pounds flour, about 0.75 to about 3.5 pounds salt, about 0.2 to about 1 pounds microbial inhibitor, about 0 to about 3 pounds gluten, about 1 to about 5 pounds leavening agent, about 0.1 to about 1 pound enzyme, about 9 to 18 pounds high fructose corn syrup, about 3 to about 10 pounds shortening, about 0.1 to about 3 pounds mono- and diglycerides, and about 45 to about 60 pounds of water.

26 Claims, 3 Drawing Sheets

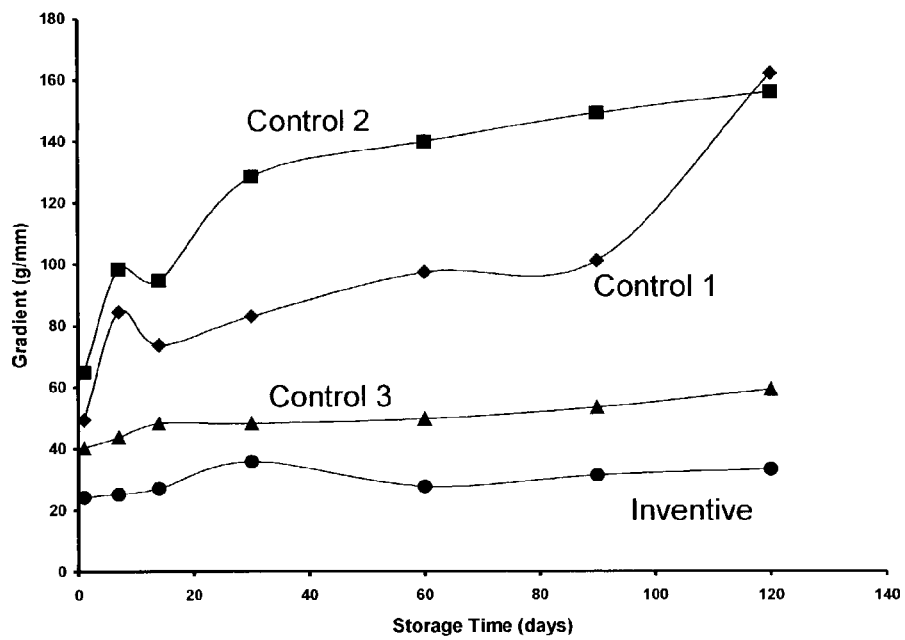
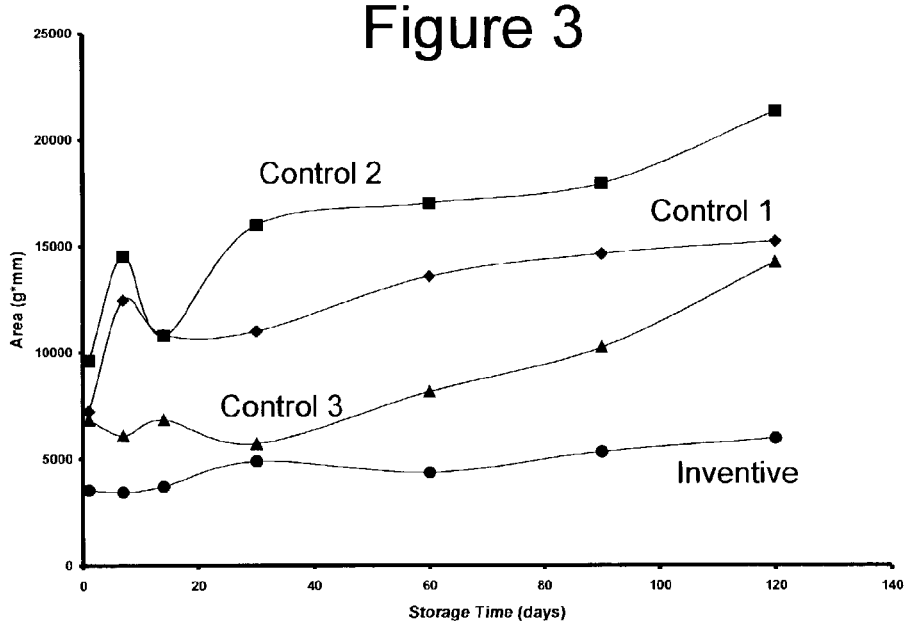

REFRIGERATED EXTENDED SHELF-LIFE BREAD PRODUCTS

FIELD OF THE INVENTION

This invention relates to refrigerated extended shelf-life, fully cooked bread products. In an important embodiment, this invention provides a refrigerated extended shelf-life, fully cooked bread bowl product which can be stored under refrigerated conditions and which retains excellent organoleptic properties (e.g., soft interior texture and firm crust) through its entire shelf life of at least about three months, and preferably about four months or longer. The refrigerated extended shelf-life, fully cooked bread bowl product of this invention is especially adapted for use in cartons and/or packages which may also contain other food ingredients (e.g., dried soup mix or ready-to-eat soup) for assembling a snack and/or complete meal.

BACKGROUND OF THE INVENTION

Convenience foods (i.e., products which require a minimum amount of consumer preparation and which can be prepared quicky) are in high demand to accommodate today's busy lifestyles. Examples range from cheese and cracker snacks and canned stews to refrigerated bagels and some frozen dinners. Typically, such products will be eaten as packaged or after a brief heating period, preferably by microwave heating. Notably absent from this category are bread products.

Baked bread products are normally available as freshly prepared products that are intended to be consumed within a relatively short time period or as frozen products which can be stored in the frozen state for relatively long periods of time. Such frozen bread products, once thawed, generally must also be consumed within a relatively short time period. Baked bread products are generally not sold as refrigerated products. Once a fully baked bread product has been refrigerated, it tends to "toughen" or become leathery, stale, and/or dry. See, for example, David, English Bread and Yeast Cookery, American Edition, p. 255 (Viking Press, New York 1977). When such a bread product becomes "leathery" (a term of art), it becomes harder to chew and loses its palatability.

Feldmeir et al., U.S. Pat. No. 6,048,558, provided a meal kit containing a baked bread or dough product in a sealed pouch which is contained within a compartment contained within a base tray having an anti-fogging agent component. The anti-fogging agent assists in maintaining freshness and retarding staling under refrigerated, non-frozen conditions. Generally the anti-fogging agent is contained within a layer of the base tray or in other container elements so that enters the compartment in a time release manner so that it gradually blooms onto the internal surfaces within the meal kit. The anti-fogging agent is though to prevent the formation of water droplets within the container and thereby allow any trapped moisture to more easily evaporate from the meal kit.

Berkowitz et al., U.S. Pat. No. 5,059,432 (Oct. 22, 1001), extended the shelf life of a bakery product by including both a sucrose ester emulsifier and a polyvinyl-pyrrolidone synthetic hydrocolloid in a conventional dough mixture from which the bakery product is formed. The sucrose ester emulsifier had a HLB value of 15 to 16 and was present in the dough in an amount of up to 1 percent. The polyvinyl-pyrrolidone synthetic hydrocolloid was included in the dough at a level of 0.5 to 2.0 percent; generally the polyvinyl-pyrrolidone synthetic hydrocolloid had a molecular weight of 300,000 g/mole or higher. By employing these additives (i.e., sucrose ester emulsifier and polyvinyl-pyrrolidone synthetic hydrocolloid), Berkowitz et al. was able to control the water activity of the bread and increase the shelf life of the product.

Apicella et al., U.S. Pat. No. 5,409,717 (issued Apr. 25, 1995, and owned by the same assignee as the present application), provided a bagel product having an extended shelf life of at least two weeks under ambient conditions. These bagels were prepared from a dough containing flour, water, yeast, salt, sugar, and a freshness-promoting combination of ingredients (i.e., monoglycerides, monosaccharide, and a starch-degrading enzyme along with optional ingredients such as oil, gum, gluten, egg solids, and an antimicrobial agent (e.g., calcium propionate)). Preferred dough formulations, based on the weight of the flour, were provided as follows:

| Ingredient | Amount |
| --- | --- |
| flour | 100 |
| high fructose corn syrup | 5–8 |
| sodium chloride | 1.5–2.5 |
| mono and diglycerides | 0.5–1.5 |
| starch-degrading enzyme | 0.25–0.6 |
| vital wheat gluten | 1–2 |
| xanthan gum/guar gum | 0.22–0.44 |
| egg whites | 1–2 |
| yeast | 1.5–3 |
| water | sufficient to provide a formable dough |

The resulting fully cooked bagels had good visual, textural, and flavor characteristics which could be maintained for at least two weeks when stored under ambient conditions in a resealable wrapper effective to reduce moisture loss.

U.S. Pat. No. 6,068,864 (issued May 30, 2000 and owned by the same assignee as the present application) employed a starch-degrading, bacterially derived amylase enzyme to prepare a bread product having improved shelf life and resistance to staleness when stored under refrigerated conditions. Shelf life under refrigerated conditions was reported to be several weeks. Dough formulations similar to U.S. Pat. No. 5,409,717 (discussed above) were used.

U.S. Pat. No. 5,209,938 (issued May 11, 1993) used an intermediate temperature stable bacterial α-amylase enzyme in a bread dough to produce bakery products with increased resistance to staling; typical improvements in softness where reported on the order of about 10 to 50 percent after about 1 to 5 days of storage under ambient conditions as compared to a control.

U.S. patent application Ser. Nos. 09/598,633 (filed Jun. 21, 2000) and Ser. No.10/043,004 (filed Jan. 8, 2002), both owned by the same assignee of the present application, provided a shelf-stable, fully cooked flatbread which can be stored under ambient conditions and which remains soft through its entire shelf life of 6 months or longer. Preferred dough formulations, based on the weight of the flour, were provided as follows:

| Ingredient | Amount |
| --- | --- |
| Flour | 100 |
| Water | 25–40 |
| Vegetable Oil | 5–20 |

-continued

| Ingredient | Amount |
| --- | --- |
| Glycerin | 5–20 |
| Corn Syrup Solids | 5–20 |
| Baking Powder | 1–3 |
| Dried Yeast | 1–4 |
| Salt | 1–4 |
| Potassium Sorbate | 0–1 |
| Calcium Propionate | 0–1 |
| Monoglyceride & Diglycerides | 0–2 |
| Fumeric Acid | 0–2 |
| L-Cysteine Hydrochloride | 0–1 |
| Spices | 0–10 |

The resulting flatbread product could be fully baked, stored at ambient temperatures for extended periods of time, and later served cold or reheated without becoming leathery, dry, stale, and/or tough.

U.S. Pat. No. 6,270,813 (issued Aug. 7, 2001) and U.S. Pat. No. 6,306,445 (issued Oct. 23, 2001) used various enzymes to help retard staling of bread products. The first-listed patent used an amylase effective for hydrolyzing both starch and amylose. The second-listed patent used one or more dehydrogenases as dough conditioners. Although neither patent provides data on shelf life, testing procedures related to anti-staling properties were continued for only 9 days under ambient temperatures, thereby suggesting that shelf life was on the order of no more than about a week or a week and a half.

There remains a need for extended shelf-life bread products. More specifically, there remains a need for bread products which can be baked, then stored for relatively long periods under refrigerated conditions, and subsequently eaten cold, warm, or hot (i.e., reheated) without further baking and without becoming leathery, and which retains the desired textural and taste properties. Moreover, there is a need for a fully baked bread product which can be used in a kit format and which retains its soft interior texture and firm crust throughout the expected shelf life of the kit and remains tasty and chewable when eaten hot or cold. There further exists a need for a ready-to-eat bread bowl product and kit containing a ready-to-eat bread bowl product which can be stored under refrigerated conditions for relatively long periods without the bread product becoming leathery, dry, and/or stale; and which remains equally tasty and satisfactorily chewable either hot or cold. It is generally preferred that the ready-to-eat bread bowl product be provided as part of a kit containing other food products, including, for example, stews, soups, chili, dips, salads, savory or sweet fillings, and the like, which can be heated as appropriate and consumed.

The present invention provides such fully baked, ready-to-eat bread products and kits containing such bread products in combination with other complementary and associated food products. More particularly, the present invention provides fully baked, ready-to-eat bread products and kits containing such bread products in combination with other complementary and associated food products. The bread products of this invention can be eaten as is or after heating. In an especially preferred embodiment, the present invention provides a fully baked, ready-to-eat bread bowl product which can be stored under refrigerated conditions and which retains excellent organoleptic properties (e.g., soft interior texture and firm crust) through its entire shelf life of at least three months, and preferably four months or longer.

SUMMARY OF THE INVENTION

The invention comprises a farinaceous bread product which can be fully baked, stored at refrigerated temperatures for extended periods of time, and later served cold or reheated without becoming leathery, dry, stale, and/or tough. Preferably, the bread product of the present invention is configured to have an overall oval shape which is adapted for use as a bread bowl with a removable center section, thereby forming a cavity into which soup or other appropriate food product can be placed. After baking, the bread product of this invention preferably has a water activity in the range of about 0.80 to about 0.94, preferably about 0.88 to about 0.93, and most preferably about 0.90 to about 0.92. When stored under a modified atmosphere (i.e., low oxygen and preferably inert gas) at refrigerated conditions (i.e., about 35 to about 45° F.), the bread product of this invention retains satisfactory soft texture and chewability characteristics throughout a shelf life of at least three months, and preferably four months or longer. Such shelf life stability is obtained without the use of additives such as anti-fogging agents and/or polyvinyl-pyrrolidone synthetic hydrocolloid and/or related additives (i.e., pyrrolidone-containing compounds).

BRIEF DESCRIPTION OF THE DRAWINGS

FIGS. 2–4 provide data illustrating the improvements in shelf life as provided by the present invention in comparison with prior art and other control samples.

FIG. 2 is a graph showing gradient as a function of time for inventive and control samples.

FIG. 3 is a graph showing area as a function of time for inventive and control samples.

FIG. 4 is a graph showing force as a function of time for inventive and control samples. Legend: ●—inventive sample; ■—control 1; ♦—control 2; ▲—control 3. Experimental details are provided in Example 2.

DETAILED DESCRIPTION OF PREFERRED EMBODIMENTS

Figure 1:
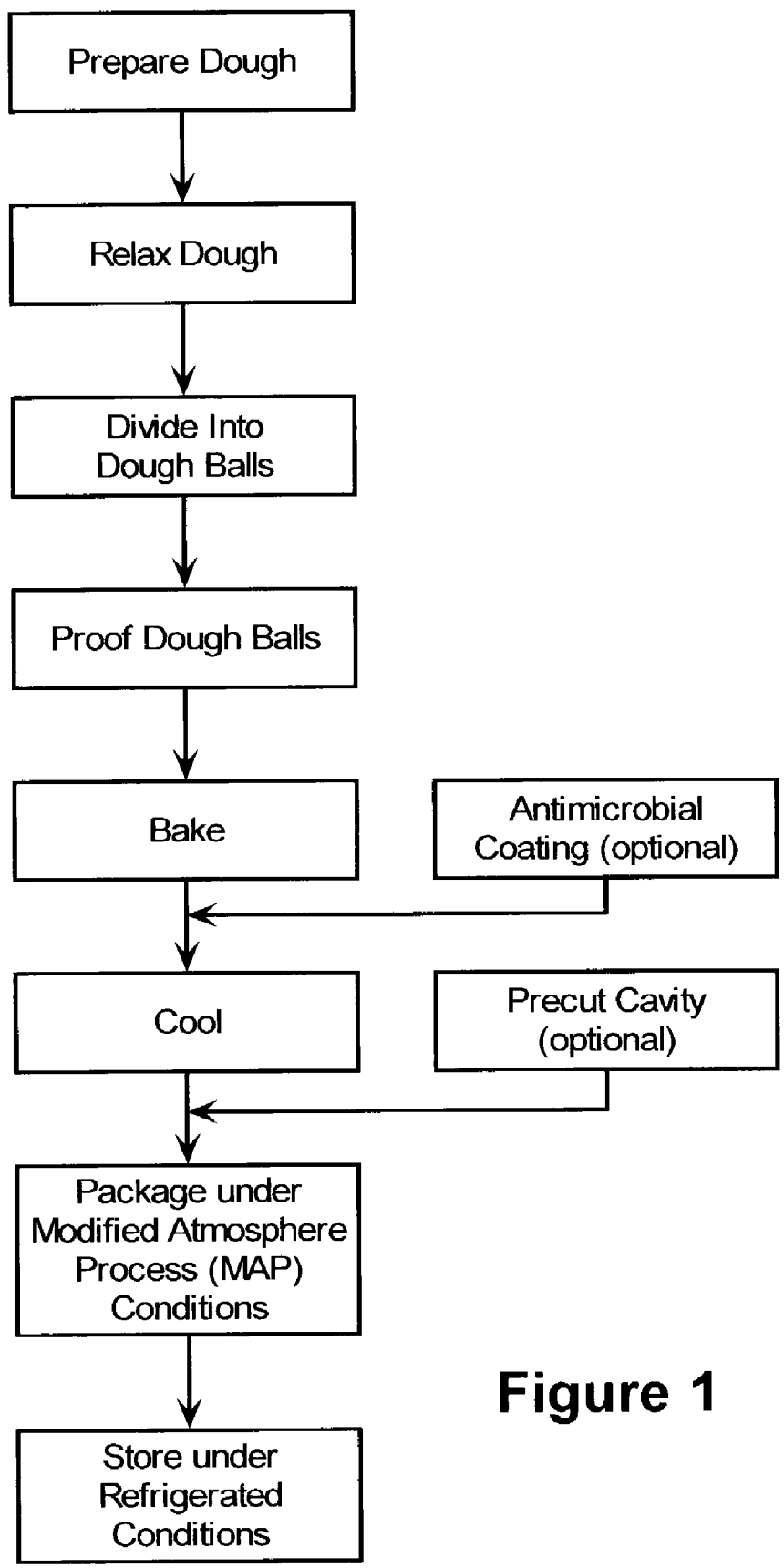
FIG. 1 provides a flow chart illustrating a general method for the production of bread bowls according to the present invention.

The invention comprises fully baked bread products which can be stored under refrigerated conditions for extended periods of time and which retain their desirable soft texture for the shelf life of the products. Moreover, the fully baked, bread products of this invention retain their desirable soft texture throughout the entire shelf life of the products (e.g., at least three months, and preferably four months or longer) while maintained under a modified atmosphere (i.e., low oxygen and preferably inert gas) at refrigerated conditions (i.e., about 35 to about 45° F.) without the use of additives such as anti-fogging agents and/or polyvinyl-pyrrolidone synthetic hydrocolloid and/or related additives (i.e., pyrrolidone-containing compounds).

A preferred fully baked product of the present invention is a bread bowl which is preferably bowl- or oval-shaped with a diameter of about 3 to about 7 inches and thickness of about 2 to about 5 inches such that at least a portion of the interior can be removed and the cavity used for containing soup or other food products. More preferably, the bread bowl of this invention is about 4 to about 6 inches in diameter and about 2.5 to about 4 inches thick. Generally, the cavity should be sized to contain about 4 to about 14 ounces of the desired complementary food product (e.g., soup or other food products). Of course, as those skilled in the art will realize, other shapes and dimensions can be used if desired so long such bread bowl products can be used for their intended purpose.

The fully baked bread product is preferably packaged in a pouch, tray, envelope, or the like, under inert gas and/or inert gas flushed conditions (e.g., low oxygen and low moisture atmosphere). Such separate packages can be formed from plastic film (e.g., pouches), paper, metal foil, or laminates containing two or more of these materials. The materials employed for the containers may include oxygen-impermeable materials, water barrier layers, and the like as desired.

The percentages used in the present specification to describe the bread dough are generally "baker's percentages," which are weight percentages based on the weight of flour used in a specific recipe (generally per 100 pounds of flour). For example, for 100 pounds of flour in a recipe, 57 percent or pounds water and 1.5 percent or pounds salt would mean the addition of 57 pounds of water and 1.5 pounds of salt to 100 pounds of flour. Of course, such baker's percentages do not normally add up to 100 percent. Conventional percentages can be calculated from baker's percentages by normalizing to 100 percent.

Baking science involves a complicated process employing time, temperature, and relative humidity to produce various food products. The time, temperature and relative humidity parameters are generally different for bread, rolls, pizza crusts, pastries, and cereal products, not only with regard to their appearance (color, size, and the like), but also with regard to the development and functioning of formula ingredients responsible for dough development, texture, and size. Some of the desirable changes caused by baking are protein denaturing, starch gelatinization, moisture migration, and veracity (cell development or grain). Although many factors may be involved in preparing a baked product which is appealing in the eyes of the ultimate consumer, a manufacturer must also consider items such as shelf life and how a consumer will actually use a product. Consequently, it is desirable to have some quantitative measure by which one can determine whether a production line product meets specification. One such measure is water activity. The bread products of the present invention will generally have water activities of about 0.80 to about 0.94, preferably about 0.88 to about 0.93, and most preferably about 0.90 to about 0.92. The water activity of the bread product may be measured within 24 hours after the fully baked bread product is removed from the baking oven and packaged. Moisture content of the packaged bread product may be measured using an $a_w$ meter or by weight difference between the product after cooling to about 100° F. and after further, more complete drying (i.e., using a desiccator or other suitable and reliable method). Preferably, the moisture content of the fully baked bread product is about 20 to about 30 percent, and preferably about 25 to about 27 percent. The pH of the bread product is generally in the range of about 5 to about 5.7 with a pH of about 5.3 to about 5.5 being preferred.

Since yeast and/or other leavening agents are included in the formulation of the bread product, a fermentation or rising step is included in the dough preparation. The fermentation step allows the yeast to produce carbon dioxide gas which stretches and mellows the gluten contained in the flour and aids in producing good flavor and texture. The bread dough formulations of the present invention generally have significantly higher levels of corn syrup than do conventional dough formulations. Although not wishing to be limited by theory, it is believed that the high levels of corn syrup or corn syrup solids, along with dehydration during baking, allows lower water activities to be obtained while still maintaining soft texture. These factors appear to contribute to the long shelf life (i.e., at least about three months, and preferably four months or longer) if properly packaged. Moreover, the desirable soft texture is maintained throughout the long shelf life.

A basic recipe for the bread recipe (in baker's percentages) for the bread products prepared according to the present invention is generally be as follows:

| Ingredient | Range (% flour basis) | Preferred Range (% flour basis) |
|---|---|---|
| Flour | 100 | 100 |
| Salt | 0.75–3.5 | 1–2.5 |
| Microbial Inhibitor* | 0.2–1 | 0.3–0.7 |
| Gluten | 0–3 | 0.1–1.5 |
| Leavening Agent | 1–5 | 2–3.5 |
| Enzyme | 0.1–1 | 0.2–0.4 |
| High Fructose Corn Syrup | 9–18 | 11–16 |
| Shortening | 3–10 | 4–8 |
| Monoglyceride & Diglycerides | 0.1–3 | 0.8–1.5 |
| Water | 45–60 | 48–56 |

*The microbial inhibitor may be included in the dough and/or applied to the exterior surfaces of the bread product after baking.

Suitable microbial inhibitors include, for example, calcium propionate, sodium propionate, potassium sorbate, sorbic acid, nisin, natamycin, sodium benzoate, benzoic acid, and the like. Calcium propionate and potassium sorbate are the preferred microbial inhibitors. The microbial inhibitor may be included in the dough and/or applied to the exterior surfaces of the bread product after baking. Suitable leavening agents include, for example, yeast, sodium bicarbonate, monocalcium phosphate anhydrous, sodium acid pyrophosphate, sodium aluminum phosphate, sodium aluminum sulfate, dicalcium phosphate dihydrate, glucono-δ-lactone, and the like. Preferred leavening agents include yeast, sodium bicarbonate, sodium aluminum phosphate, and mixtures thereof. Suitable enzymes include amylase, xylanase, protease, lipase, dehydrogenase, and mixtures thereof. Preferred enzymes include starch-degrading amylase as described in U.S. Pat. No. 6,068,864 (issued May 30, 2000) and U.S. Pat. No. 6,270,813 (issued Aug. 7, 2001) and dehydrogenases as described in U.S. Pat. No. 6,306,445 (Oct. 23, 2001). An especially preferred starch-degrading enzyme is commercially available as Novamyl™ from Novozymes A/S (Bagsuaerd, Denmark).

An especially preferred recipe (in baker's percentages) for the bread products prepared according to the preferred embodiment of the invention will generally be as follows:

| Ingredient | Range (% flour basis) | Preferred Range (% flour basis) | Most Preferred (% flour basis) |
|---|---|---|---|
| Flour | 100 | 100 | 100 |
| Salt | 0.75–3.5 | 1–2.5 | 1–1.5 |
| Calcium Propionate | 0.2–1 | 0.3–0.6 | 0.45–0.5 |
| Gluten | 0–3 | 0.1–1.5 | 0.5–1 |
| Dried Yeast | 1–5 | 2–3.5 | 2.2–3 |
| Enzyme | 0.1–1 | 0.2–0.4 | 0.3–0.4 |
| Sodium Bicarbonate | 0–0.75 | 0.15–0.35 | 0.2–0.3 |
| Sodium Aluminum Phosphate | 0–0.75 | 0.15–0.35 | 0.2–0.3 |

-continued

| Ingredient | Range (% flour basis) | Preferred Range (% flour basis) | Most Preferred (% flour basis) |
| --- | --- | --- | --- |
| Sodium Stearoyl Lactylate | 0–0.5 | 0.2–0.5 | 0.3–0.5 |
| High Fructose Corn Syrup | 9–18 | 11–16 | 12–15 |
| Shortening | 3–10 | 4–8 | 5–7 |
| Monoglyceride & Diglycerides | 0.1–3 | 0.8–1.5 | 0.9–1.2 |
| Water | 45–60 | 48–56 | 50–54 |

The flour is preferably hard wheat bread flour made from hard spring or winter wheat. The shortening or vegetable oil is preferably partially hydrogenated; for example, a partially hydrogenated cottonseed, corn, soybean, sunflower, canola, and similar partially hydrogenated vegetable shortening or oil as well as mixtures thereof. The preferred vegetable shortenings or oils are corn, canola, sunflower seed, cottonseed and soybean shortenings or oils, or mixture thereof. Generally, shortenings are preferred as they provide the best overall taste and organoleptic properties.

Compressed yeast may be substituted for the dried yeast used in the above basic recipe. If compressed yeast is used, the baker's percentage or weight is approximately doubled to account for the water content of the compressed yeast; likewise, the amount of water added may be reduced to account for the water content of the compressed yeast. Therefore, if compressed yeast is used in the above general recipe in place of dried yeast, the amount of compressed yeast will be in the range of about 2 to about 10 baker's percent, preferably about 4 to about 7 baker's percent. The present dough formulations do not require, and should not contain, either the anti-fogging agents of U.S. Pat. No. 6,048,558 or the pyrrolidone-containing additives of U.S. Pat. No. 5,059,432.

Of course, the dough formulations may also contain conventional bread ingredients normally used in the baking art to provide flavoring, coloring, texturizing, and the like so long as they do not adversely and significantly effect the shelf life or organoleptic properties of the resulting baked product. Thus, the present invention can be used to prepare a wide variety of bread and bread products including, for example, wheat, sourdough, as well as other types. Moreover, the bread or bread products of the present invention can contain, for example, cheese, herbs and spices, fruits, vegetables, encapsulated flavor and/or aroma ingredients, and the like as well as mixtures thereof. Additionally, the bread or bread products of the present invention can accept topical applications of, or be coated with, ingredients such as, for example, sunflower seeds, sesame seeds, corn meal, spice blends, and the like as well as mixtures thereof.

The dough is preferably prepared by mixing the dough ingredients using conventional equipment and procedures. The procedure outlined in FIG. 1 is especially adapted for preparing a bread bowl product; other bread product can be prepared using essentially the same procedure as modified to take into account the desired shape and end use of the product. After mixing, the dough is allowed to relax at ambient conditions for about 10 to 15 minutes. After relaxing, the dough is divided into dough "balls" (generally about 190 to 250 g to obtain fully baked bread bowl products having a preferred diameter of about 5 to about 6 inches and a preferred thickness of about 3 to about 4 inches). The dough balls are preferably proofed for about 30 to about 90 minutes at about 80 to about 95 percent relative humidity and a temperature of about 85 to about 110° F. More preferably the dough balls are proofed at about 50 minutes at about 85 percent relative humidity and a temperature of about 95 to about 105° F. The proofed dough balls are then baked at a temperature of about 350 to about 450° F. for about 10 to 24 minutes, and more preferably at a temperature of about 375 to about 400° F. for about 12 to 20 minutes. If desired, the baked bread bowl product can be spayed or otherwise coated with a microbe inhibitor; preferably, the baked product is sprayed with an aqueous solution containing about 0.5 to about 15 percent, and preferably about 10 percent, potassium sorbate. After cooling, the bread bowl product can be packaged, preferably under an inert gas or inert-gas flushed atmosphere, and then stored under refrigeration conditions (about 35 to about 45° F.) for at least about three months, and preferably four months or longer.

If desired, an inner core of the bread bowl product can be precut prior to packaging so that the ultimate consumer can easily remove the inner core to obtain the bowl portion of the bread bowl product having a cavity for receiving soup or other food products in order to prepare a meal or snack; the consumer may, of course, consume the removed inner core as part of the meal or snack. Generally, the cavity should be sized to contain about 4 to about 14 ounces of the desired complementary food product (e.g., soup or other food products). Such precutting can be done using conventional techniques and procedures. See, e.g., U.S. Pat. No. 5,974,934 (issued Nov. 2, 1999) and U.S. Pat. No. 6,042,864 (issued Mar. 28, 2000). It is generally, preferred that the inner core remain within the cavity during storage and that it only be removed when the consumer prepares the product for final consumption. For consumption, normally the inner core will be removed and the cavity filled with the desired food product. If filled with soup or other foods desired to be warmed, the filled bread bowl may be heated in a microwave oven prior to consumption. The inner core may be used as a bread product for consumption with the bread bowl and its contents.

The present invention provides bread products, especially bread bowls, which can be baked and then later served cold or reheated without becoming leathery, dry, stale and/or tough. Generally, the bread products will have a water activity in the range about 0.80 to about 0.94 (preferably about 0.88 to about 0.93) and will retain satisfactory texture and chewability characteristics throughout the shelf life. The bread bowl product of this invention is especially adapted for use in a "single-serving" kit as a snack or in a "multiple-serving" kit for a meal or snack. Such kits will contain one or more bread bowl products along with other appropriate food products or components. Especially preferred are kits containing at least one individual pre-cut bread bowl product and a complementary food product that the consumer can place in a cavity formed in the bread bowl product by removing a pre-cut inner core. Suitable complementary food products include, for example, soup, salad, dips, and the like; especially preferred complementary food products include dry soup mixtures which can be reconstituted with water and ready-to-eat soups. The complementary food product may be provided with the bread bowl product (i.e., as a kit) or may be supplied by the consumer at the time of consumption. Of course, other additional products, including both food and non-food items, can be included in the kit.

Preferably, such a kit is in the form of a tray having separate compartments and/or pouches for the various ingre dients formed therein. The bread products, preferably after cooling, are preferably sealed under an inert and/or reduced oxygen/moisture atmosphere to increase the shelf life of the product or kit. For example, the bread products can be packaged in a film pouch or bag using vacuum and then flushing with nitrogen or other inert gas before sealing. Under refrigerated conditions, the bread products of this invention have a shelf life of at least three months (and preferably four months or longer) and maintain their soft texture throughout this shelf life period. Of course, other methods of providing an inert or low-oxygen atmosphere can be used. The various compartments within the tray may also be sealed under an inert or low-oxygen atmosphere. The other components can also be sealed in similar pouches, cups, or compartment formed in the tray itself which can then be sealed. For multiple-serving kits, the individual components can be separately sealed under inert atmosphere conditions and then included in a box or other packaging material. The plastic films used for the pouches and/or the tray seal preferably comprise oxygen barrier layers. The various components used to make the trays, pouches, and other containers in the kits of this invention do not require, and should not contain, the anti-fogging agents of U.S. Pat. No. 6,048,558.

The following examples are intended to illustrate the invention and not to limit or otherwise restrict the invention. Unless indicated otherwise, all percentages are based on weight. All patents, patent applications, and publications referred to in this specification are hereby incorporated by reference.

EXAMPLE 1

This example illustrates the preparation of a bread bowl product according to the present invention. A bread bowl dough was made using the following "bread bowl dough" formulation:

| Ingredient | Amounts (% flour basis) |
| --- | --- |
| Flour | 100 |
| Salt | 2.5 |
| Calcium Propionate | 0.45 |
| Gluten | 1.0 |
| Instant Dry Yeast | 2.5 |
| Novamyl ™ Enzyme | 0.32 |
| Sodium Bicarbonate | 0.25 |
| Sodium Aluminum Phosphate | 0.25 |
| Sodium Stearoyl Lactylate | 0.3 |
| High Fructose Corn Syrup | 12.0 |
| Shortening | 5.0 |
| Monoglyceride & Diglycerides | 1.0 |
| Water | 54.0 |

All dry components were mixed using low speed mixing for about 1 minute, followed by the wet components using low speed mixing for about 2 minutes followed by medium speed mixing for about 7 minutes. The resulting dough was allowed to relax at ambient temperatures for about 15 minutes and then separated into roughly round dough pieces (about 225 g/piece). The dough pieces were placed parchment paper, sprinkled with corn meal and then proofed at about 85 percent relative humidity and 105° F. for about 50 minutes. Satisfactory proofing can be determined when the dough stays indented when pressed lightly with a finger.

After proofing, the top surface of the proofed dough pieces was coated with an oil wash (i.e., brushed with a partially hydrogenated soybean oil) and then scored in an "X-pattern." The resulting dough pieces were baked at about 375° F. in a commercial oven for about 17 minutes to yield the fully baked bread bowl product.

The cooled, fully baked bread bowl products were then individually packaged in polyethylene bags using modified atmosphere techniques (e.g., flushed with a mixture of nitrogen/carbon dioxide gas and sealed).

The resulting bread bowl products had a round bowl shape (diameter of about 5 inches with a thickness of about 3 inches), bread-like texture with open cell crumb structure with no significant breaks or shredding, and a firm crust. The bread bowl products exhibited pleasing texture after microwave heating with or without soup in a later-cut cavity (i.e., remained relatively soft for at least 30 minutes after microwave heating). Moreover, the bread bowl products had sufficient structural strength to hold hot soup with minimal liquid absorption and maintained their pleasing texture for at least 30 minutes. Under refrigerated conditions, packaged bread bowl products had a shelf life of at least 4 months and maintained their soft texture and other desirable organoleptic properties throughout this shelf life period.

EXAMPLE 2

Figure 4:
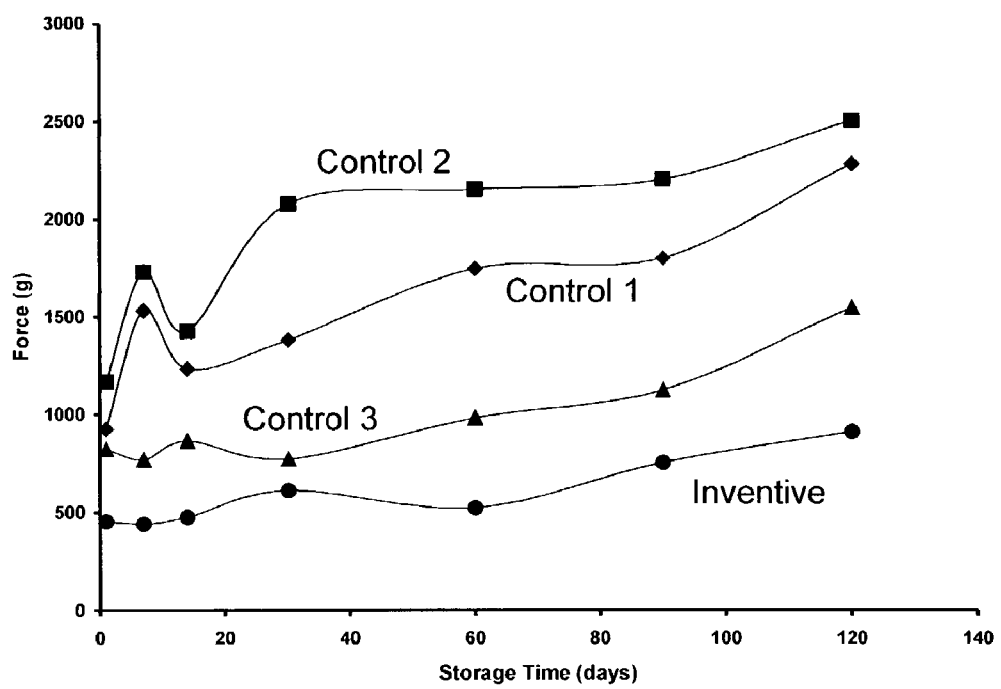

This example compares the inventive bread bowl products of this invention with several prior art and other control samples. The following samples were prepared and evaluated:

| Sample | Legend in FIGS. 2–4 | Description |
| --- | --- | --- |
| Inventive | ● | Inventive bread bowl as prepared in Example 1 above; stored under inert atmosphere at refrigeration temperatures |
| Control 1 | ■ | Control bagel as prepared using bagel dough formulation and process as described in Example 1 of U.S. Pat. No. 5,409,717; stored in twist tie plastic bag at ambient temperatures |
| Control 2 | ◆ | Control bagel as prepared using bagel dough formulation and process as described in Example 1 of U.S. Pat. No. 5,409,717; stored under inert atmosphere at ambient temperatures |
| Control 3 | ▲ | Control bread bowl as prepared using bagel dough formulation as described in Example 1 of U.S. Pat. No. 5,409,717 and process as described in Example 1 of present application; stored under inert atmosphere at refrigeration temperatures |

In addition, two "frozen control" (FC) samples were prepared. The FC for Control 1 and 2 samples was prepared using essentially the same process as for Control 1 except that, rather than being stored under ambient conditions, it was stored frozen. The FC for Control 3 and the inventive samples was prepared using essentially the same process as for the inventive except that, rather than being stored under refrigerated conditions, it was stored frozen. The "bagel dough" formulation used in Control 1–3 samples was based on U.S. Pat. No. 5,409,717 as follows:

| Ingredient | Amounts (% flour basis) |
|---|---|
| Flour | 100 |
| Salt | 2.1 |
| Calcium Propionate | 0.16 |
| Gluten | 1.0 |
| Instant Dry Yeast | 0.75 |
| Novamyl ™ Enzyme | 1.0 |
| High Fructose Corn Syrup | 6.25 |
| Monoglyceride & Diglycerides | 1.0 |
| Water | 58.0 |
| Guar gum | 0.3 |
| Egg White | 1.0 |
| Panodan ™ * | 0.15 |

*Commercial dough conditioner containing diacetyl tartaric acid esters of mono- and diglycerides (Grindstad Products, Inc., Industrial Airport, Kansas).

As compared to the "bread bowl dough" formulation of Example 1, the "bagel dough" formulation used for the control samples did not contain any sodium bicarbonate, sodium aluminum phosphate, sodium stearoyl lactylate, or shortening. Likewise, as compared to the "bagel dough" formulation used for the control samples, the "bread bowl dough" formulation of Example 1 did not contain any guar gum, egg white, or Panadan™.

The inventive and control samples were subjected to shelf life studies over a four month period. Periodically, samples were removed from storage and evaluated. For Control Samples 1 and 2 (stored under ambient conditions), samples were evaluated at the same ambient conditions; the corresponding frozen controls were removed from the freezer and maintained at room temperature for about 45 minutes and then evaluated at ambient temperature. For Control Sample 3 and the Inventive Sample (stored under refrigerated conditions), samples were heated in a microwave oven for 30 seconds and then evaluated after a two minute delay; the corresponding frozen controls were removed from the freezer and maintained at room temperature for about 30 minutes, heated in a microwave oven for 30 seconds, and then evaluated after a two minute delay. Evaluations were carried out by a trained panel of 4 to 6 individuals. For the evaluations for a given property, lower values indicate less of the relevant property and higher values indicate more of the relevant property; scores were generally from 1 to 9. The following results were obtained.

TABLE 1

Comparison of Control 1 (#1) with Corresponding Frozen Control (FC)

| | Storage Time | | | | | | | | | | | | | | | |
|---|---|---|---|---|---|---|---|---|---|---|---|---|---|---|---|---|
| | 1 day | | 1 week | | 2 weeks | | 3 weeks | | 1 month | | 2 months | | 3 months | | 4 months | |
| Property | FC | #1 | FC | #1 | FC | #1 | FC | #1 | FC | #1 | FC | #1 | FC | #1 | FC | #1 |
| Mold | No | No | No | No | No | No | No | No | No | No | No | Yes | N | Yes | No | Yes |
| Firmness | 7 | 7 | 7 | 8 | 5 | 6 | 5 | 4 | 7 | 9 | 6 | 9 | 7 | 10 | 7 | 11 |
| Chewiness | 4 | 4 | 4 | 5 | 3 | 4 | 2 | 1 | 4 | 7 | 7 | 10 | 7 | 11 | 7 | 12 |
| Staleness (texture) | 3 | 3 | 3 | 4 | 2 | 3 | 2 | 3 | 3 | 5 | 3 | 7 | 4 | 7 | 4 | 9 |
| Crust color | 5 | 5 | 5 | 5 | 3 | 3 | 5 | 5 | 5 | 5 | 5 | 5 | 6 | 5 | 5 | 5 |
| Crumb color | 2 | 2 | 2 | 2 | 2 | 2 | 2 | 2 | 2 | 2 | 2 | 2 | 1 | 1 | 1 | 1 |
| Overall bread flavor | 5 | 5 | 5 | 5 | 5 | 5 | 5 | 5 | 6 | 3 | 4 | 0 | 2 | −1 | 2 | −2 |
| Off aroma | 0 | 0 | 0 | 0 | 0 | 0 | 0 | 0 | 0 | 2 | 0 | 4 | 0 | 3 | 0 | 4 |
| Off flavor | 0 | 0 | 0 | 0 | 0 | 0 | 0 | 0 | 0 | 2 | 0 | 3 | 0 | 3 | 0 | 4 |
| General Comments | #1 with more open cell structure than FC, bland | | Firmer than FC, both are bland | | Tight cell structure, chewy, bland | | FC was slightly stale; #1 was softer, bland | | FC had tough crust; #1 had noticeable stale texture, off flavor borderline eating quality | | FC & #1 were stale, unacceptable | | FC & #1 were stale, unacceptable | | #1 was stale, moldy & sour flavor, unacceptable | |

TABLE 2

Comparison of Control 2 (#2) with Corresponding Frozen Control (FC)

| | Storage Time | | | | | | | | | | | | | | | |
|---|---|---|---|---|---|---|---|---|---|---|---|---|---|---|---|---|
| | 1 day | | 1 week | | 2 weeks | | 3 weeks | | 1 month | | 2 months | | 3 months | | 4 months | |
| Property | FC | #2 | FC | #2 | FC | #2 | FC | #2 | FC | #2 | FC | #2 | FC | #2 | FC | #2 |
| Mold | No | No | No | No | No | No | No | No | No | No | No | No | No | Yes | No | Yes |
| Firmness | 7 | 7 | 7 | 7 | 5 | 6 | 5 | 7 | 7 | 9 | 6 | 8 | 7 | 10 | 7 | 11 |
| Chewiness | 4 | 4 | 4 | 4 | 4 | 5 | 2 | 4 | 4 | 6 | 7 | 9 | 7 | 11 | 7 | 12 |
| Staleness (texture) | 3 | 3 | 3 | 3 | 2 | 3 | 2 | 4 | 3 | 5 | 3 | 6 | 4 | 7 | 4 | 8 |
| Crust color | 5 | 5 | 5 | 5 | 3 | 5 | 5 | 7 | 5 | 5 | 5 | 5 | 6 | 5 | 5 | 5 |

TABLE 2-continued

Comparison of Control 2 (#2) with Corresponding Frozen Control (FC)

| | Storage Time | | | | | | | | | | | | | | |
|---|---|---|---|---|---|---|---|---|---|---|---|---|---|---|---|
| | 1 day | | 1 week | | 2 weeks | | 3 weeks | | 1 month | | 2 months | | 3 months | | 4 months | |
| Property | FC | #2 | FC | #2 | FC | #2 | FC | #2 | FC | #2 | FC | #2 | FC | #2 | FC | #2 |
| Crumb color | 2 | 2 | 2 | 2 | 2 | 2 | 2 | 2 | 2 | 2 | 2 | 2 | 1 | 1 | 1 | 0 |
| Overall bread flavor | 5 | 5 | 5 | 6 | 5 | 4 | 5 | 3 | 6 | 3 | 4 | 2 | 2 | -2 | 2 | -1 |
| Off aroma | 0 | 0 | 0 | 0 | 0 | 0 | 0 | 0 | 0 | 0 | 0 | 2 | 0 | 3 | 0 | 4 |
| Off flavor | 0 | 0 | 0 | 0 | 0 | 0 | 0 | 0 | 0 | 0 | 0 | 2 | 0 | 3 | 0 | 5 |
| General Comments | Essentially the same | | Essentially the same | | #2 was firmer & chewier than FC | | FC slightly stale; #2 was chewier, harder, lacked fresh flavor | | Both stale, borderline acceptable | | #2 had no bread flavor, very tough | | #2 had chemical aftertaste, very tough, unacceptable | | #2 had dry texture, stale flavor, moldy, sour flavor, old refrigerator taste, unacceptable | |

TABLE 3

Comparison of Control 3 (#3) with Corresponding Frozen Control (FC)

| | Storage Time | | | | | | | | | | | | | |
|---|---|---|---|---|---|---|---|---|---|---|---|---|---|---|
| | 1 day | | 1 week | | 2 weeks | | 1 month | | 2 months | | 3 months | | 4 months | |
| Property | FC | #3 | FC | #3 | FC | #3 | FC | #3 | FC | #3 | FC | #3 | FC | #3 |
| Mold | No | No | No | No | No | No | No | No | No | No | No | No | No | Yes |
| Firmness | 3 | 4 | 3 | 5 | 3 | 5 | 3 | 5 | 3 | 5 | 3 | 6 | 3 | 6 |
| Chewiness | 2 | 3 | 2 | 4 | 2 | 4 | 2 | 4 | 2 | 4 | 2 | 5 | 2 | — |
| Staleness (texture) | 0 | 1 | 0 | 2 | 0 | 2 | 0 | 3 | 0 | 2 | 0 | 3 | 0 | — |
| Crust color | 5 | 6 | 5 | 5 | 5 | 5 | 5 | 5 | 5 | 5 | 5 | 4 | 5 | 4 |
| Crumb color | 2 | 2 | 2 | 2 | 2 | 3 | 2 | 1 | 2 | 1 | 1 | 1 | 1 | 1 |
| Overall bread flavor | 7 | 5 | 7 | 5 | 7 | 5 | 7 | 4 | 7 | 5 | 6 | 4 | 6 | — |
| Off aroma | 0 | 0 | 0 | 0 | 0 | 0 | 0 | 0 | 0 | 0 | 0 | 1 | 0 | 5 |
| Off flavor | 0 | 0 | 0 | 0 | 0 | 0 | 0 | 1 | 0 | 1 | 0 | 2 | — | — |
| General Comments | #3 drier, blander, lacked pleasant bread flavor | | #3 drier, blander, lacked pleasant bread flavor | | #3 stale, tough, blander, lacked pleasant bread flavor | | #3 stale, tough, blander, chewy, slightly off flavor, borderline acceptable pleasant bread flavor | | #3 bland, stale texture, borderline acceptable | | #3 bland flavor, soda/chemical aftertaste, very tough, almost unacceptable | | #3 visible mold, smelled alcohol, acetone, mildewy, very tough, unacceptable | |

TABLE 4

Comparison of Inventive Sample (Inv.) with Corresponding Frozen Control (FC)

| | Storage Time | | | | | | | | | | | | | | |
|---|---|---|---|---|---|---|---|---|---|---|---|---|---|---|---|
| | 1 day | | 1 week | | 2 weeks | | 3 weeks | | 1 month | | 2 months | | 3 months | | 4 months | |
| Property | FC | Inv. | FC | Inv. | FC | Inv. | FC | Inv. | FC | Inv. | FC | Inv. | FC | Inv. | FC | Inv. |
| Mold | No | No | No | No | No | No | No | No | No | No | No | No | No | No | No | No |
| Firmness | 3 | 3 | 3 | 3 | 3 | 3 | 3 | 3 | 3 | 3 | 3 | 3 | 3 | 4 | 3 | 4 |
| Chewiness | 2 | 2 | 2 | 2 | 2 | 2 | 2 | 2 | 2 | 2 | 2 | 2 | 2 | 3 | 2 | 3 |
| Staleness (texture) | 0 | 0 | 0 | 0 | 0 | 0 | 0 | 0 | 0 | 0 | 0 | 0 | 0 | 1 | 0 | 0 |
| Crust color | 5 | 5 | 5 | 5 | 5 | 5 | 5 | 6 | 5 | 6 | 5 | 5 | 5 | 5 | 5 | 5 |
| Crumb color | 2 | 2 | 2 | 2 | 2 | 2 | 2 | 2 | 2 | 2 | 2 | 2 | 1 | 1 | 1 | 1 |
| Overall bread flavor | 7 | 7 | 7 | 7 | 7 | 7 | 7 | 8 | 7 | 8 | 7 | 6 | 6 | 5 | 6 | 5 |
| Off aroma | 0 | 0 | 0 | 0 | 0 | 0 | 0 | 0 | 0 | 0 | 0 | 0 | 0 | 0 | 0 | 0 |
| Off flavor | 0 | 0 | 0 | 0 | 0 | 0 | 0 | 0 | 0 | 0 | 0 | 0 | 0 | 0 | 0 | 0 |

TABLE 4-continued

Comparison of Inventive Sample (Inv.) with Corresponding Frozen Control (FC)

| | Storage Time | | | | | | | | | | | | | | |
|---|---|---|---|---|---|---|---|---|---|---|---|---|---|---|---|
| | 1 day | | 1 week | | 2 weeks | | 3 weeks | | 1 month | | 2 months | | 3 months | | 4 months |
| Property | FC | Inv. | FC | Inv. | FC | Inv. | FC | Inv. | FC | Inv. | FC | Inv. | FC | Inv. | FC | Inv. |
| General Comments | Essentially the same; very acceptable | | Essentially the same; very acceptable | | Essentially the same; very acceptable | | Inventive had better bread flavor, slightly chewier; very acceptable | | Essentially the same; very acceptable | | Inventive slightly less sweet; very acceptable | | Essentially the same; very acceptable | | Inventive slightly less yeasty & bread flavor; very acceptable |

The data in Tables 1–4 clearly shows the surprising and unexpected results provided by the present invention. Only the inventive samples (i.e., prepared as in Example 1 using the bread bowl dough formulation) exhibited excellent quality in all aspects over the entire four month period of the tests. Only the inventive sample maintained good overall eating quality over the entire four months testing period.

FIGS. 2–4 also compare several textural properties of Control Samples 1–3 and the inventive sample as a function of storage time. Measurements were made with a TAXT2 Texture Analyzer (Texture Technology Corp., Scarsdale, N.Y.) equipped with a punch and die fixture. FIG. 2 provides a graph of gradient (g/mm), which provides an indication of firmness and freshness, as a function of storage time. FIG. 3 provides a graph of area (g*mm), which provides an indication of toughness, as a function of storage time. FIG. 4 provides a graph of force (g), which provides an indication of hardness, as a function of storage time. As with the organolipetic and related date of Tables 1–4, only the inventive sample shows stability and acceptable values over the four month period.

We claim:

1. A fully baked bread product comprising a fully baked bread prepared with a dough comprising, in baker's percentages, about 100 pounds flour, about 0.75 to about 3.5 pounds salt, about 0.2 to about 1 pounds microbial inhibitor, about 0 to about 3 pounds gluten, about 1 to about 5 pounds leavening agent, about 0.1 to about 1 pound enzyme, about 9 to about 18 pounds high fructose corn syrup, about 3 to about 10 pounds shortening, about 0.1 to about 3 pounds mono- and diglycerides, and about 45 to about 60 pounds of water, wherein the fully baked bread is of a desired shape and has a water activity of about 0.80 to about 0.94 which gives the fully baked bread product a soft texture, wherein the soft texture can be maintained, when sealed in an inert atmosphere without the use of an anti-fogging agent and stored at refrigeration temperatures, for a period of at least 3 months.

2. The fully baked bread product as defined in claim 1, wherein the water activity is about 0.88 to about 0.93 and the period for which the soft texture can be maintained is at least four months.

3. The fully baked bread product as defined in claim 1, wherein the desired shape is a bread bowl from having a diameter of about 3 to about 7 inches and a thickness of about 2 to about 5 inches.

4. The fully baked bread product as defined in claim 2, wherein the desired shape is a bread bowl from having a diameter of about 4 to about 6 inches and a thickness of about 2.5 to about 4 inches.

5. The fully baked bread product as defined in claim 3, wherein the dough comprises in baker's percentages, about 100 pounds flour, about 1 to about 2.5 pounds salt, about 0.3 to about 0.6 pounds microbial inhibitor, about 0.1 to about 1.5 pounds gluten, about 2 to about 3.5 pounds leavening agent, about 0.2 to about 0.4 pound enzyme, about 11 to about 16 pounds high fructose corn syrup, about 4 to about 8 pounds shortening, about 0.8 to about 1.5 pounds mono- and diglycerides, and about 48 to about 56 pounds of water.

6. The fully baked bread product as defined in claim 4, wherein the dough comprises in baker's percentages, about 100 pounds flour, about 1 to about 2.5 pounds salt, about 0.3 to about 0.6 pounds microbial inhibitor, about 0.1 to about 1.5 pounds gluten, about 2 to about 3.5 pounds leavening agent, about 0.2 to about 0.4 pound enzyme, about 11 to about 16 pounds high fructose corn syrup, about 4 to about 8 pounds shortening, about 0.8 to about 1.5 pounds mono- and diglycerides, and about 48 to about 56 pounds of water.

7. The fully baked bread product of claim 5, wherein microbial inhibitor is selected from the group consisting of calcium propionate, sodium propionate, potassium sorbate, sorbic acid, nisin, natamycin, sodium benzoate, benzoic acid, and mixtures thereof, wherein the leavening agent is selected from the group consisting of yeast, sodium bicarbonate, monocalcium phosphate anhydrous, sodium acid pyrophosphate, sodium aluminum phosphate, sodium aluminum sulfate, dicalcium phosphate dihydrate, glucono-δ-lactone, and mixtures thereof, and wherein the enzyme is selected from the group consisting of amylase, xylanase, protease, lipase, dehydrogenase, and mixtures thereof.

8. The fully baked bread product of claim 6, wherein microbial inhibitor is selected from the group consisting of calcium propionate, sodium propionate, potassium sorbate, sorbic acid, nisin, natamycin, sodium benzoate, benzoic acid, and mixtures thereof, wherein the leavening agent is selected from the group consisting of yeast, sodium bicarbonate, monocalcium phosphate anhydrous, sodium acid pyrophosphate, sodium aluminum phosphate, sodium aluminum sulfate, dicalcium phosphate dihydrate, glucono-δ-lactone, and mixtures thereof, and wherein the enzyme is selected from the group consisting of amylase, xylanase, protease, lipase, dehydrogenase, and mixtures thereof.

9. The fully baked bread product of claim 7, wherein microbial inhibitor is selected from the group consisting of calcium propionate, potassium sorbate, and mixtures thereof, wherein the leavening agent is selected from the group consisting of yeast, sodium bicarbonate, sodium aluminum phosphate, and mixtures thereof, and wherein the enzyme is selected from the group consisting of amylase, dehydrogenase, and mixtures thereof.

10. The fully baked bread product of claim 8, wherein microbial inhibitor is selected from the group consisting of calcium propionate, potassium sorbate, and mixtures thereof, wherein the leavening agent is selected from the group consisting of yeast, sodium bicarbonate, sodium aluminum phosphate, and mixtures thereof, and wherein the enzyme is selected from the group consisting of amylase, dehydrogenase, and mixtures thereof.

11. A process for preparing a fully baked bread product having a desired shape and a water activity of about 0.80 to about 0.94 which gives the fully baked bread product a soft texture, wherein the soft texture can be maintained, when sealed in an inert atmosphere without the use of an anti-fogging agent and stored at refrigeration temperatures, for a period of at least 3 months, said a process comprising:
(1) forming a dough comprising, in baker's percentages, about 100 pounds flour, about 0.75 to about 3.5 pounds salt, about 0.2 to about 1 pounds microbial inhibitor, about 0 to about 3 pounds gluten, about 1 to about 5 pounds leavening agent, about 0.1 to about 1 pound enzyme, about 9 to about 18 pounds high fructose corn syrup, about 3 to about 10 pounds shortening, about 0.1 to about 3 pounds mono- and diglycerides, and about 45 to about 60 pounds of water;
(2) relaxing the dough for about 10 to about 15 minutes at ambient temperature;
(3) dividing the relaxed dough into individual dough balls of a size sufficient to obtain the desired shape;
(4) proofing the dough balls at a relative humidity of about 80 to about 95 percent relative humidity at a temperature of about 85 to 110° F. for about 30 to about 90 minutes;
(5) forming the proofed dough balls into the desired shape;
(6) baking the desired shaped dough balls at a temperature of about 350 to about 450° F. until fully baked;
(7) cooling the fully baked bread product; and
(8) sealing the cooled fully baked bread product in the inert atmosphere,
wherein the sealed fully baked bread product has a water activity of about 0.80 to about 0.94 which gives the fully baked bread product a soft texture, wherein the soft texture can be maintained, when sealed in the inert atmosphere and stored at refrigeration temperatures, for a period of at least 3 months.

12. The process as defined in claim 11, wherein the water activity is about 0.88 to about 0.93 and the period for which the soft texture can be maintained is at least four months.

13. The process as defined in claim 12, wherein the desired shape is a bread bowl from having a diameter of about 3 to about 7 inches and a thickness of about 2 to about 5 inches.

14. The process as defined in claim 13, wherein the dough comprises in baker's percentages, about 100 pounds flour, about 1 to about 2.5 pounds salt, about 0.3 to about 0.6 pounds microbial inhibitor, about 0.1 to about 1.5 pounds gluten, about 2 to about 3.5 pounds leavening agent, about 0.2 to about 0.4 pound enzyme, about 11 to about 16 pounds high fructose corn syrup, about 4 to about 8 pounds shortening, about 0.8 to about 1.5 pounds mono- and diglycerides, and about 48 to about 56 pounds of water.

15. The process of claim 14, wherein microbial inhibitor is selected from the group consisting of calcium propionate, sodium propionate, potassium sorbate, sorbic acid, nisin, natamycin, sodium benzoate, benzoic acid, and mixtures thereof, wherein the leavening agent is selected from the group consisting of yeast, sodium bicarbonate, monocalcium phosphate anhydrous, sodium acid pyrophosphate, sodium aluminum phosphate, sodium aluminum sulfate, dicalcium phosphate dihydrate, glucono-δ-lactone, and mixtures thereof, and wherein the enzyme is selected from the group consisting of amylase, xylanase, protease, lipase, dehydrogenase, and mixtures thereof.

16. The process of claim 15, wherein microbial inhibitor is selected from the group consisting of calcium propionate, potassium sorbate, and mixtures thereof, wherein the leavening agent is selected from the group consisting of yeast, sodium bicarbonate, sodium aluminum phosphate, and mixtures thereof, and wherein the enzyme is selected from the group consisting of amylase, dehydrogenase, and mixtures thereof.

17. The process of claim 12, wherein the fully baked bread product, prior to sealing, is precut to allow easy removal of an interior portion, thereby creating a cavity suitable for containing a complimentary food product.

18. A shelf stable kit for making a snack or meal, said kit comprising a carton, at least one fully baked bread bowl product; and one or more other food components; a plurality of containers within the carton to hermetically seal the bread bowl product and the one or more other food components from atmosphere external of the carton; wherein the bread bowl product is made from a dough formulation comprising, in baker's percentages, about 100 pounds flour, about 0.75 to about 3.5 pounds salt, about 0.2 to about 1 pounds microbial inhibitor, about 0 to about 3 pounds gluten, about 1 to about 5 pounds leavening agent, about 0.1 to about 1 pound enzyme, about 9 to about 18 pounds high fructose corn syrup, about 3 to about 10 pounds shortening, about 0.1 to about 3 pounds mono- and diglycerides, and about 45 to about 60 pounds of water; wherein the fully baked bread bowl product has a water activity of about 0.80 to about 0.94 which gives the fully baked bread bowl product a soft texture, wherein the soft texture can be maintained, when hermetically sealed and stored at refrigeration temperatures without the use of an anti-fogging agent, for a period of at least 3 months.

19. The shelf stable kit as defined in claim 18, wherein the bread bowl product and each of the one or more other food components are hermetically sealed in individual packages under an inert atmosphere or under inert gas flushed conditions.

20. The shelf stable kit as defined in claim 19, wherein the one or more other food components are selected from the group consisting of stews, soups, chili, dips, salads, savory fillings, and sweet fillings.

21. The shelf stable kit as defined in claim 20, wherein the kit is a multiple-serving meal kit containing a plurality of bread bowl products.

22. The shelf stable kit as defined in claim 19, wherein the water activity is about 0.88 to about 0.93 and the period for which the soft texture can be maintained is at least four months.

23. The shelf stable kit as defined in claim 22, wherein bread bowl product has a diameter of about 3 to about 7 inches and a thickness of about 2 to about 5 inches and wherein the bread bowl product is precut to have a removal inner core which, when removed, forms a cavity suitable for containing at least one of the other food components.

24. The shelf stable kit as defined in claim 23, wherein the dough formulation comprises in baker's percentages, about 100 pounds flour, about 1 to about 2.5 pounds salt, about 0.3 to about 0.6 pounds microbial inhibitor, about 0.1 to about 1.5 pounds gluten, about 2 to about 3.5 pounds leavening agent, about 0.2 to about 0.4 pound enzyme, about 11 to about 16 pounds high fructose corn syrup, about 4 to about 8 pounds shortening, about 0.8 to about 1.5 pounds mono- and diglycerides, and about 48 to about 56 pounds of water.

25. The shelf stable kit of claim 24, wherein microbial inhibitor is selected from the group consisting of calcium propionate, sodium propionate, potassium sorbate, sorbic acid, nisin, natamycin, sodium benzoate, benzoic acid, and mixtures thereof, wherein the leavening agent is selected from the group consisting of yeast, sodium bicarbonate, monocalcium phosphate anhydrous, sodium acid pyrophosphate, sodium aluminum phosphate, sodium aluminum sulfate, dicalcium phosphate dihydrate, glucono-δ-lactone, and mixtures thereof, and wherein the enzyme is selected from the group consisting of amylase, xylanase, protease, lipase, dehydrogenase, and mixtures thereof.

26. The shelf stable kit of claim 25, wherein microbial inhibitor is selected from the group consisting of calcium propionate, potassium sorbate, and mixtures thereof, wherein the leavening agent is selected from the group consisting of yeast, sodium bicarbonate, sodium aluminum phosphate, and mixtures thereof, and wherein the enzyme is selected from the group consisting of amylase, dehydrogenase, and mixtures thereof.

* * * * *

UNITED STATES PATENT AND TRADEMARK OFFICE
CERTIFICATE OF CORRECTION

PATENT NO.         : 7,014,878 B2                                         Page 1 of 1
APPLICATION NO. : 10/198562
DATED              : March 21, 2006
INVENTOR(S)        : Tangprasertchai et al.

It is certified that error appears in the above-identified patent and that said Letters Patent is hereby corrected as shown below:

On Title page, (56) column 2, (Other Publications), line 1, delete "10/043,004, filed Sep. 26, 2002", and insert -- 10/043,004, Published on September 26, 2002 --.

Signed and Sealed this

Twenty-first Day of November, 2006

JON W. DUDAS
*Director of the United States Patent and Trademark Office*